(12) United States Patent
Chavez

(10) Patent No.: US 6,419,730 B1
(45) Date of Patent: Jul. 16, 2002

(54) GAS TRANSMISSION SYSTEM INCLUDING A WATER SEPARATOR

(76) Inventor: Felix Chavez, 16900 Hwy. 12, Weston, CO (US) 81091

( * ) Notice: Subject to any disclaimer, the term of this patent is extended or adjusted under 35 U.S.C. 154(b) by 0 days.

(21) Appl. No.: 09/649,154

(22) Filed: Aug. 28, 2000

(51) Int. Cl.[7] .............................................. B01D 45/08
(52) U.S. Cl. ............................ 96/189; 96/190; 55/430; 55/433; 55/465
(58) Field of Search .......................... 96/188, 189, 190; 55/462, 464, 465, 430, DIG. 14, 428, 432, 433; 95/267, 272

(56) References Cited

U.S. PATENT DOCUMENTS

| | | | | |
|---|---|---|---|---|
| 381,374 A | * | 4/1888 | Hine | 55/464 |
| 769,440 A | * | 9/1904 | Huxley | 55/464 |
| 2,349,944 A | * | 5/1944 | Dixon | 96/189 |

* cited by examiner

Primary Examiner—Robert A. Hopkins
(74) Attorney, Agent, or Firm—John E. Toupal; Harold G. Jarcho

(57) ABSTRACT

A water separator for a gas transmission system and including a cylindrical vessel having a front end wall defining a gas inlet, a rear end wall defining a gas outlet, and a bottom wall defining at least one water discharge opening; a tank disposed below the vessel and having at least one water entry opening communicating with the one discharge opening, and a water drain opening; and at least one solid baffle projecting transversely into and obstructing gas flow through an upper portion of the vessel, the baffle being substantially axially aligned with the gas inlet and substantially transversely aligned with the discharge opening.

16 Claims, 5 Drawing Sheets

GAS TRANSMISSION SYSTEM INCLUDING A WATER SEPARATOR

BACKGROUND OF THE INVENTION

This invention relates generally to a gas transmission system and, more particularly, to a gas transmission system including a separator apparatus for removing moisture from gas flowing in the system. The system can be used, for example, to gather and dry methane gas seeping out of coal beds.

Various devices have been used to remove moisture from flowing gas in efforts to meet the minimum moisture limitations of gas transmission lines. One example of such a device is disclosed in U.S. Pat. No. 5,753,013. However, known water separator devices have suffered from various disadvantages including inefficiency and high fabrication and installation costs.

The object of this invention, therefore, is to provide an improved, less costly, water separator for flowing gas systems.

SUMMARY OF THE INVENTION

The invention is a water separator for a gas transmission system and including a cylindrical vessel having a front end wall defining a gas inlet, a rear end wall defining a gas outlet, and a bottom wall defining at least one water discharge opening; a tank disposed below the vessel and having at least one water entry opening communicating with the one discharge opening, and a water drain opening; and at least one solid baffle projecting transversely into and obstructing gas flow through an upper portion of the vessel, the baffle being substantially axially aligned with the gas inlet and substantially transversely aligned with the discharge opening. The baffle functions to efficiently direct gas flowing through the vessel to direct moisture content thereof into the tank.

According to one feature of the invention, the gas inlet is disposed in an upper portion of the front end wall and longitudinally spaced from the discharge opening, and the baffle has a bottom edge substantially aligned axially with a bottom edge of the gas inlet and transversely aligned with a front edge of the discharge opening. This geometric feature facilitates the efficient separation of moisture in the flowing gas.

According to other features of the invention, the baffle projects angularly into a vessel with an upper end displaced from the bottom edge in a direction toward the front end wall and the baffle has an arcuate upper edge joined to the vessel and a substantially rectilinear bottom edge. These features further enhance moisture removal.

According to yet other features of the invention, the bottom wall defines another water discharge opening disposed between the one discharge opening and rear end wall, the tank has another water entry opening communicating with the another discharge opening; and the system includes another solid baffle projecting transversely into and obstructing gas flow through the upper portion of said vessel. The additional baffle separates moisture not removed by the first baffle to thereby improve efficiency.

According to a further feature, the invention also includes a valve disposed between the water discharge openings and the water entry openings, and a gas pressure inlet into the tank. After closing of the valves, the pressure inlet can be used to eject water accummulated in the tank.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
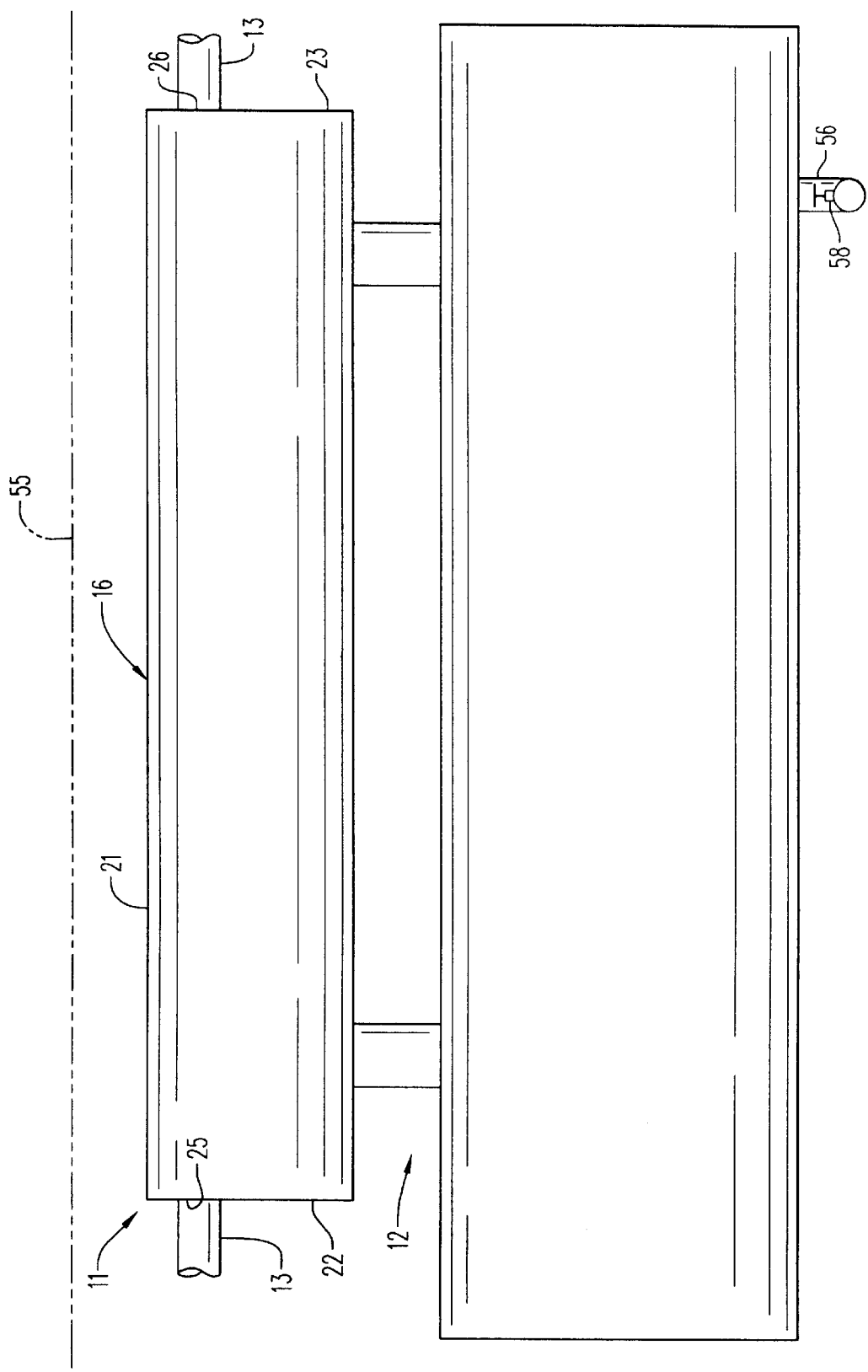
FIG. 1 is a front elevational view of a gas transmission system with a water separator according to the invention.
Figure 2:
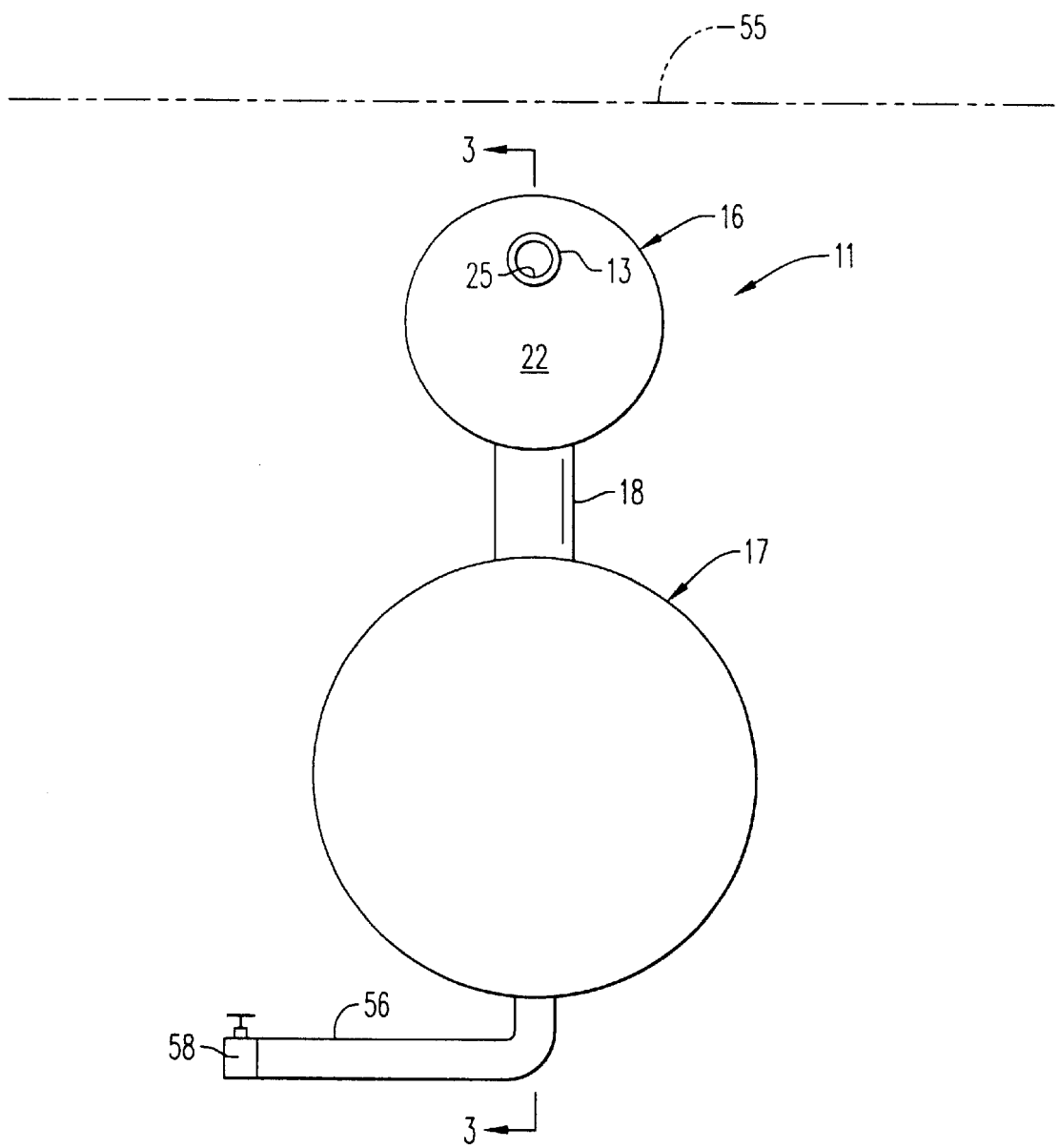
FIG. 2 is an end view of the system shown in FIG. 1.
Figure 4:
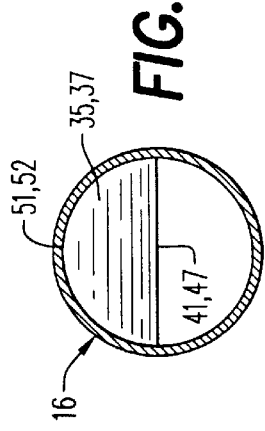
FIG. 4 is a cross-sectional view taken along lines 4—4 of FIG. 3.
Figure 3:
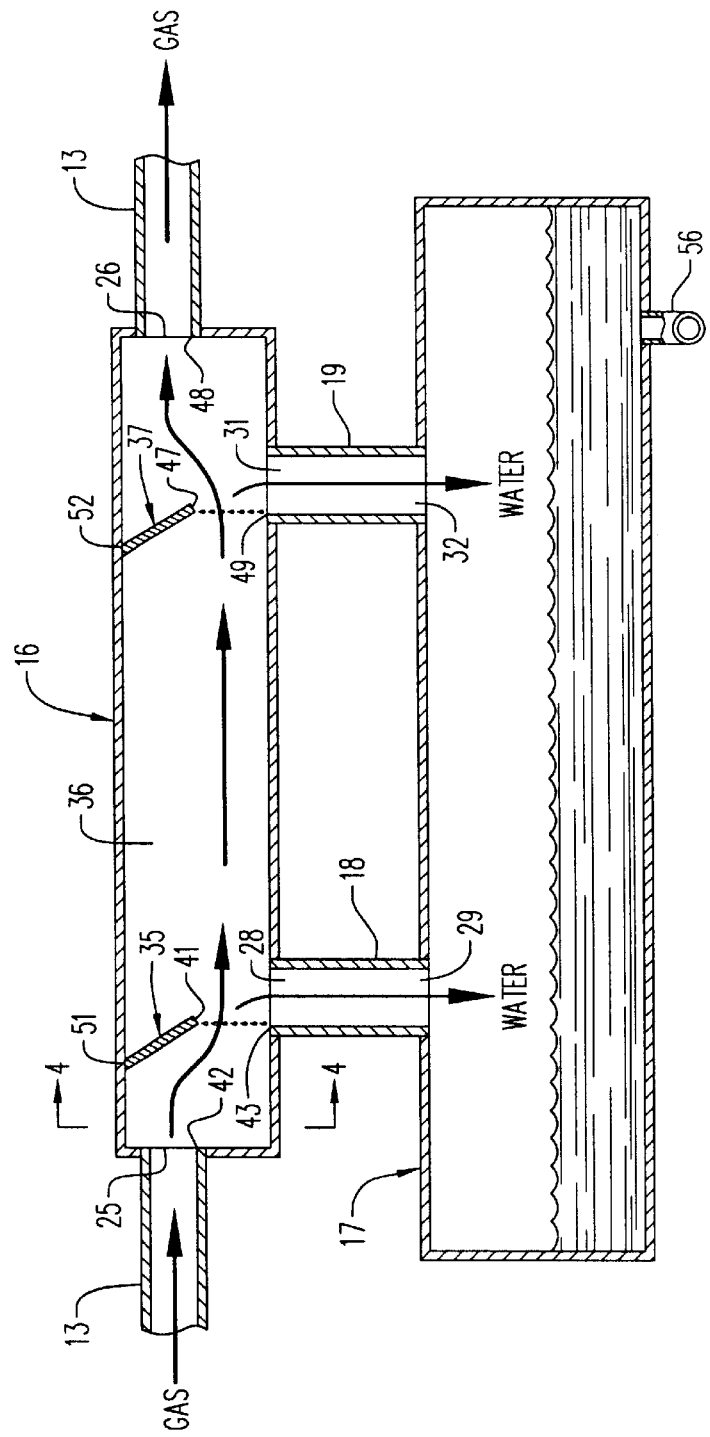
FIG. 3 is a cross-sectional view taken along lines 3—3 of FIG. 2.

A gas transmission system 11 includes a water separator 12 connected in a gathering line 13 extending, for example, out of a methane gas well (not shown). The water separator 12 includes a cylindrical vessel 16 and a cylindrical tank 17 joined by connecting pipes 18 and 19. As shown in FIGS. 1–3, the cylindrical vessel 16 is vertically aligned above and parallel to the cylindrical tank 17.

The vessel 16 is a hollow metallic cylinder having ends closed by a front wall 22 and a rear wall 23. Defined in an upper portion of the front wall 22 is a gas inlet 25 connected to one end of the gas line 13. Similarly defined by an upper portion of the rear wall 23 is a gas outlet 26 aligned with the gas inlet 25 and connected to an opposite end of the gathering line 13. One water discharge opening 28 formed in a bottom portion of the cylinder 21 and longitudinally spaced from the gas inlet 25 communicates via the pipe 18 with one water entry opening 29 in an upper portion of the cylindrical tank 17. Another water discharge opening 31 is formed in a bottom portion of the cylinder 21 between the discharge opening 28 and the gas outlet 26. The discharge opening 31 communicates via the pipe 19 with another water entry opening 32 in the upper portion of the cylindrical tank 17.

One solid plate baffle 35 has an arcuate upper edge joined to an inner wall portion of the vessel 16 and projects transversely thereinto so as to obstruct gas flow in an upper portion 36 thereof. Also projecting into the cylindrical vessel 16 is another solid baffle plate 37 which obstructs gas flow in the upper portion 36 between the aligned gas inlet 25 and gas outlet 26. The baffle 35 has a rectilinear bottom edge 41 aligned axially with a bottom edge 42 of the gas inlet 25 and transversely aligned with a front edge 43 of the water discharge opening 28. Similarly, the baffle 37 has a rectilinear bottom edge 47 axially aligned with a bottom edge 48 of the gas outlet 26 and transversely aligned with a front edge 49 of the water discharge opening 31. Each of the baffles 35, 37 projects angularly into the upper portion 36 with their arcuate upper ends 51, 52, displaced, respectively, from the rectilinear bottom edges 41, 47 in a direction toward the front wall 22. Preferably, the baffles 28 and 31 are oriented with respect to the horizontal at angles of between 30° and 60°. Also, the water separator 12 preferably is disposed below a ground surface 55 with the holding tank 17 below the frost line. Consequently, water within the tank 17 will not be subjected to freezing conditions and the entire separator 12 will not adversely effect environmental aesthetics.

During use of the separator 12, gas being transmitted through the gathering line 13 between the gas inlet 25 and gas inlet 26 is sequentially obstructed by the baffles 35, 37. In response to such obstruction, heavier water particles in the gas stream are directed downwardly by the baffles 35, 37 toward, respectively, the water discharge openings 28, 31 while the lighter methane gas continues to flow between the inlet 25 and the outlet 26. Because of their strategic placement and angled orientation, the baffles 35, 37 create a minimum of gas flow restriction and turbulence and, consequently, little or no loss in gas pressure while separating moisture content which flows through the discharge openings 28, 31 into the holding tank 17 via the pipes 18, 19. After accummulation to a predetermined level, water collected in the holding tank 17 can be emptied through a drain pipe 56 by opening of a drain control valve 58.

Figure 5:
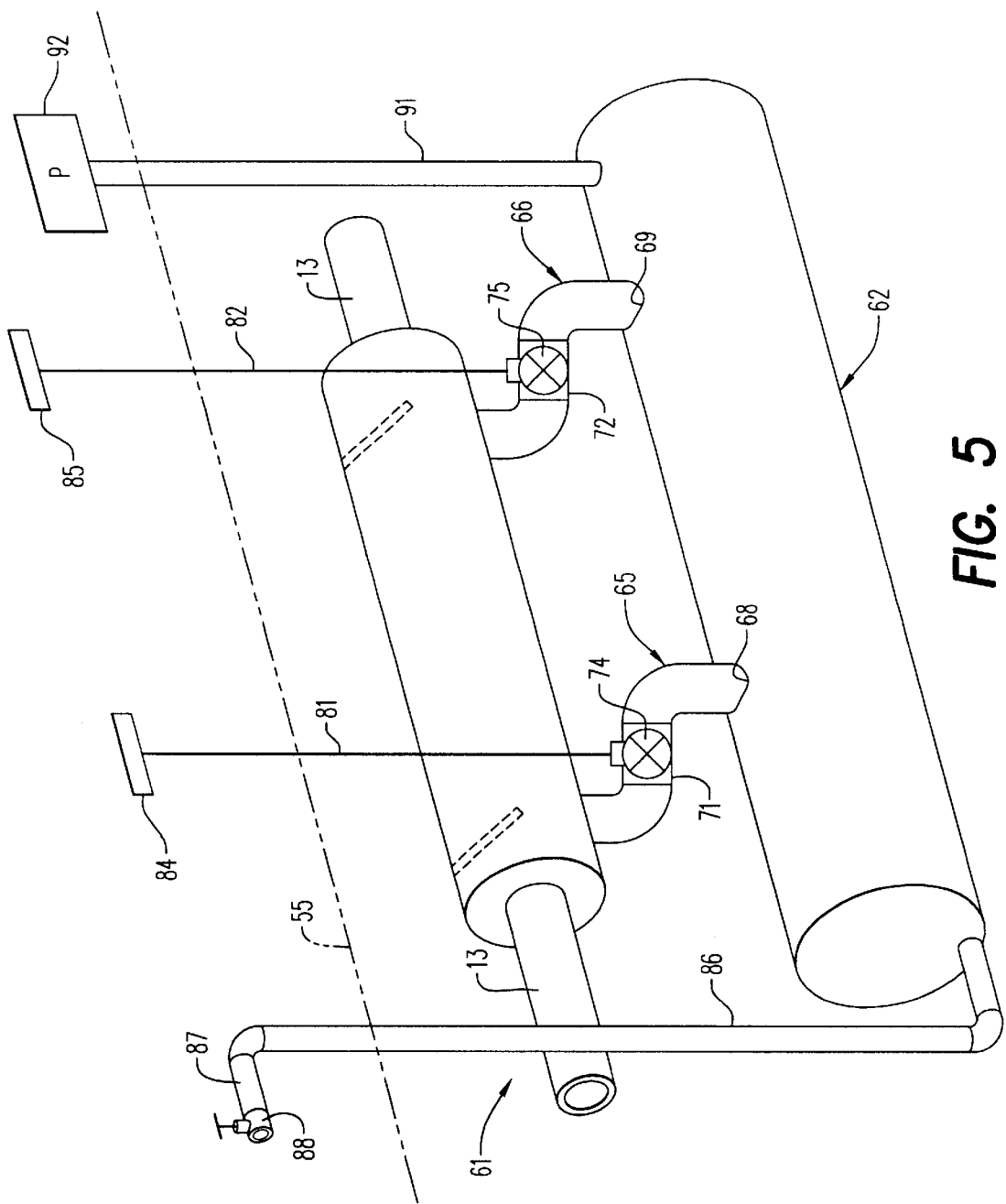
FIG. 5 is a perspective view of a modified water separator embodiment of the invention.
Figure 6:
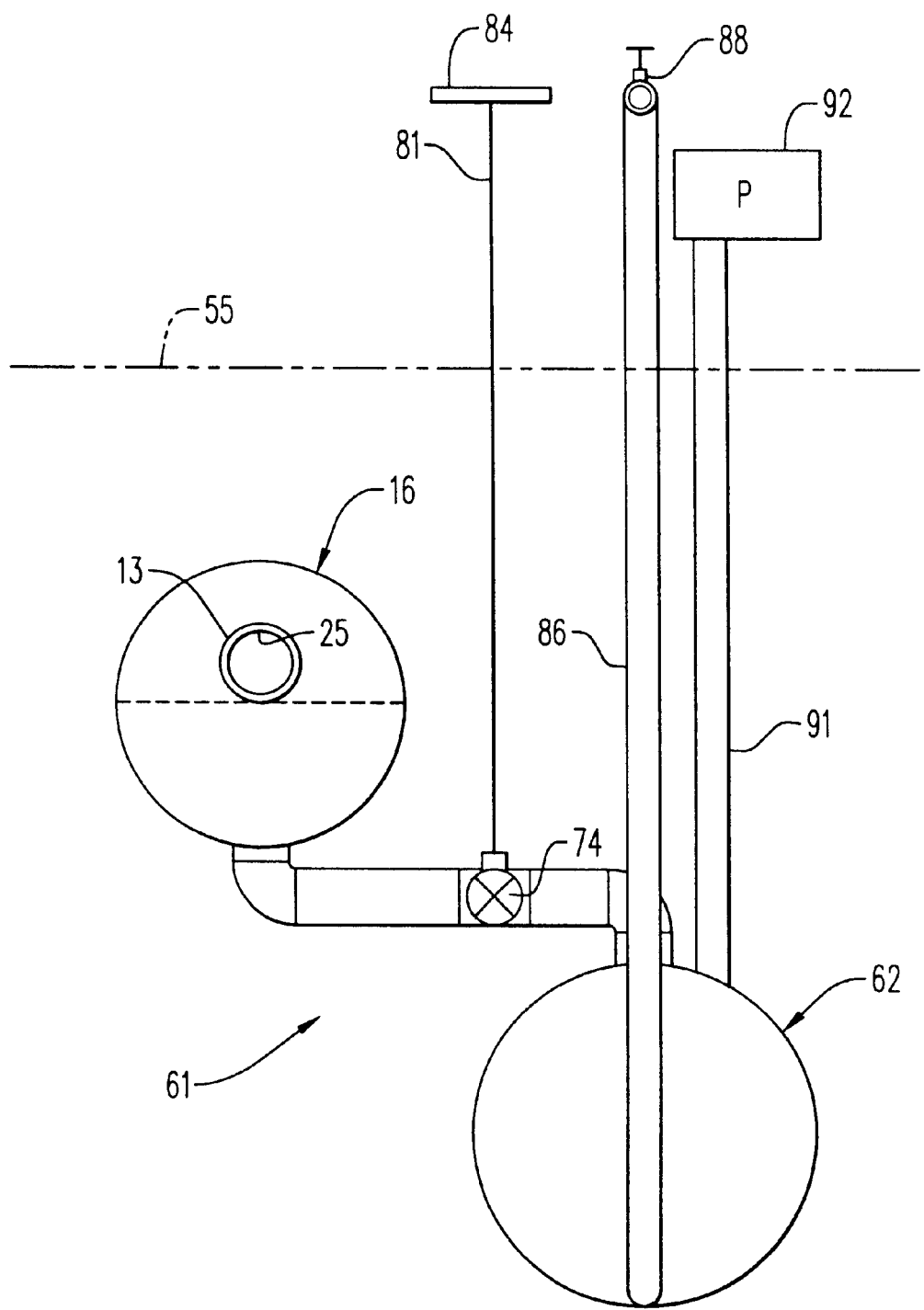
FIG. 6 is an end view of the water separator shown in FIG. 5.

Illustrated in FIGS. 5 and 6 is another gas transmission system embodiment 61 of the invention. The system 61 is similar to the embodiment 11 described above and identical components thereof have been given the same reference numerals. Again, the cylindrical vessel 12 is connected in a gas gathering line 13. In embodiment 61, however, a water holding tank 62 is disposed both below and transversely spaced from the cylindrical vessel 16. The water discharge openings 28, 31 of the vessel 16 are joined by pipes 65, 66, respectively, to water entry openings 68, 69 in an upper wall portion of the tank 62. In this case, the pipes 65, 66 have horizontally extending mid-sections 71, 72 which retain, respectively, valves 74, 75 transversely displaced from the vessel 16. Elongated actuators 81, 82 are operatively coupled to, respectively, the valves 74, 75 and include handles 84, 85 accessible above the ground surface 55. A drain pipe 86 extends out of a bottom portion of the tank 62 and includes an above ground section 87 retaining a valve 88. Communicating with the upper portion of the tank 62 is a pressurizing pipe 91 having an upper end connected to a source of gas pressure 92 positioned above the ground surface 55.

Operation of the system 61 is similar to that of the system 11 described above. However in this case, the holding tank 62 can be emptied conveniently from above the ground surface 55. When emptying of the tank 62 is desired, the handles 84 and 85 are operated to close the valves 74 and 75 and the drain valve 88 is opened. Next the pressure source 92 which can be, for example, a tank of pressurized nitrogen is actuated to inject gas into the tank 62 via the line 91. The resultant pressure increase in the upper portion of the tank 62 forces water out through the drain pipe 87 and opened valve 88. If desired, a conventional liquid level float system can be used periodically to automatically empty the tank 62.

Obviously, many modifications and variations of the present invention are possible in light of the above teachings. It is to be understood, therefore, that the invention can be practiced otherwise than as specifically described.

What is claimed is:

1. A water separation apparatus for a gas transmission system, said apparatus comprising:
    a vessel having a front end wall defining a gas inlet in an upper portion thereof, a rear end wall defining a gas outlet, and a bottom wall defining at least one water discharge opening longitudinally spaced between said gas inlet and said gas outlet;
    a tank disposed below said vessel and having at least one water entry opening communicating with said at least one discharge opening, and a water drain opening; and
    at least one solid baffle projecting transversely into and obstructing gas flow through an upper portion of said vessel, said at least one solid baffle having a bottom edge substantially axially aligned with a bottom edge of said gas inlet and substantially transversely aligned with a front edge of said at least one discharge opening.

2. An apparatus according to claim 1 wherein said baffle projects angularly into said vessel with an upper end displaced from said bottom edge in a direction toward said front end wall.

3. An apparatus according to claim 2 wherein said vessel is cylindrical and said baffle has an arcuate upper edge joined to said vessel and a substantially rectilinear said bottom edge.

4. An apparatus according to claim 3 wherein said bottom wall defines another water discharge opening disposed between said at least one discharge opening and said rear end wall, and said tank has another water entry opening communicating with said another discharge opening; and including another solid baffle projecting transversely into and obstructing gas flow through said upper portion of said vessel.

5. An apparatus according to claim 4 wherein said gas outlet is substantially axially aligned with said gas inlet.

6. An apparatus according to claim 5 wherein said gas inlet is disposed in an upper portion of said first end wall and longitudinally spaced from said at least one discharge opening, said one and another baffles have bottom edges substantially aligned axially with a bottom edge of said gas inlet and transversely aligned, respectively, with a front edge of said at least one discharge opening and a front edge of said another discharge opening.

7. An apparatus according to claim 6 wherein each of said one and another baffles project angularly into said vessel with an upper edge displaced from said bottom edge in a direction toward said front end wall.

8. An apparatus according to claim 7 wherein each of said one and another baffles has an arcuate upper edge joined to said vessel and a substantially rectilinear bottom edge.

9. An apparatus according to claim 1 including one valve disposed between said at least one water discharge opening and said at least one water entry opening, and a gas pressure inlet into said tank.

10. An apparatus according to claim 9 including an actuator for said valve; and wherein said actuator extends above said vessel.

11. An apparatus according to claim 10 wherein said tank is disposed below said vessel and transversely spaced therefrom; said at least one water discharge opening is joined to said at least one water entry opening by a pipe retaining said one valve.

12. An apparatus according to claim 11 wherein said baffle projects angularly into said vessel with an upper end displaced from said bottom edge in a direction toward said front end wall.

13. An apparatus according to claim 12 wherein said vessel is cylindrical and said baffle has an arcuate upper edge joined to said vessel and a substantially rectilinear said bottom edge.

14. A water separation apparatus for a gas transmission system, said apparatus comprising:
    a vessel having a front end wall defining a gas inlet, a rear end wall defining a gas outlet, and a bottom wall defining at least one water discharge opening;
    a tank disposed below said vessel and having at least one water entry opening communicating with said at least one discharge opening, and a water drain opening;

at least one solid baffle projecting transversely into and obstructing gas flow through an upper portion of said vessel, said baffle being substantially axially aligned with said gas inlet and substantially transversely aligned with said at least one discharge opening;

one valve disposed between said at least one water discharge opening and said at least one water entry opening; and a gas pressure inlet into said tank.

15. An apparatus according to claim 14 including an actuator for said valve; and wherein said actuator extends above said vessel.

16. An apparatus according to claim 15 wherein said tank is disposed below said vessel and transversely spaced therefrom; said at least one water discharge opening is joined to said at least one water entry opening by a pipe retaining said one valve.

* * * * *